United States Patent
Ge

(10) Patent No.: US 10,111,129 B2
(45) Date of Patent: Oct. 23, 2018

(54) METHOD AND APPARATUS FOR ADMISSION CONTROL OF WIRELESS COMMUNICATIONS NETWORK

(71) Applicant: Huawei Technologies Co., Ltd., Shenzhen, Guangdong (CN)

(72) Inventor: Chenhui Ge, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 235 days.

(21) Appl. No.: 14/814,000

(22) Filed: Jul. 30, 2015

(65) Prior Publication Data

US 2015/0341824 A1 Nov. 26, 2015

Related U.S. Application Data

(63) Continuation of application No. PCT/CN2013/071162, filed on Jan. 30, 2013.

(51) Int. Cl.
| | |
|---|---|
| *H04W 28/02* | (2009.01) |
| *H04M 7/00* | (2006.01) |
| *H04L 12/927* | (2013.01) |
| *H04W 48/02* | (2009.01) |
| *H04W 48/18* | (2009.01) |

(52) U.S. Cl.
CPC ....... *H04W 28/0268* (2013.01); *H04L 47/805* (2013.01); *H04M 7/006* (2013.01); *H04W 28/0236* (2013.01); *H04W 28/0263* (2013.01); *H04W 48/02* (2013.01); *H04W 48/18* (2013.01)

(58) Field of Classification Search
CPC ......... H04W 28/0268; H04W 28/0236; H04W 28/0263; H04W 48/02; H04W 48/18; H04L 47/805; H04M 7/006
See application file for complete search history.

(56) References Cited

U.S. PATENT DOCUMENTS

| | | | |
|---|---|---|---|
| 2006/0133346 A1 | 6/2006 | Chheda et al. | |
| 2010/0284272 A1* | 11/2010 | Wang | H04W 28/24 370/230 |
| 2013/0272121 A1* | 10/2013 | Stanwood | H04L 47/2475 370/230 |

FOREIGN PATENT DOCUMENTS

| | | |
|---|---|---|
| CN | 1996990 A | 7/2007 |
| CN | 101471869 A | 7/2009 |

(Continued)

*Primary Examiner* — Ricky Q Ngo
*Assistant Examiner* — Stephen N Steiner

(57) ABSTRACT

The present invention discloses a method for admission control of a wireless communications network. The method includes: comparing waiting time for scheduling of a first service with a first admission threshold, where the first service is a service for which a bearer has been established; if the waiting time for scheduling of the first service is greater than the first admission threshold, comparing a satisfaction rate of the first service with a second admission threshold; and if the satisfaction rate of the first service is greater than or equal to the second admission threshold, allowing establishment of a bearer for a second service, where the second service is a service for which bearer establishment is requested. According to the technical solutions provided in embodiments of the present invention, system capacity of a wireless communications network can be effectively improved without requiring complex and inaccurate calculation of resource usage.

15 Claims, 8 Drawing Sheets

(56) References Cited

FOREIGN PATENT DOCUMENTS

| CN | 101494877 A | 7/2009 |
|---|---|---|
| CN | 102104968 A | 6/2011 |

\* cited by examiner

METHOD AND APPARATUS FOR ADMISSION CONTROL OF WIRELESS COMMUNICATIONS NETWORK

CROSS-REFERENCE TO RELATED APPLICATIONS

This application is a continuation of International Application No. PCT/CN2013/071162, filed on Jan. 30, 2013, which is hereby incorporated by reference in its entirety.

TECHNICAL FIELD

The present invention relates to the field of wireless communications technologies, and in particular, to a method and an apparatus for admission control of a wireless communications network.

BACKGROUND

In a wireless communications system, information transfer between a user equipment (user equipment, "UE" for short) and a radio access network (radio access network, "RAN" for short) is performed through an air interface (air interface, "air interface" for short). Because air interface resources (also called radio resources) are limited, radio resource management (radio resource management, "RRM" for short) has emerged at the right moment. Its basic goal is to improve network coverage and system capacity as much as possible under a premise of ensuring quality of service (quality of service, "QoS" for short) of an accessed service. To ensure the QoS of the accessed service, it is necessary to perform admission control (admission control) for a service request according to a usage condition of a resource, that is, to determine, according to a load condition of the system, whether to establish a bearer (bearer) for a new service request.

For a traditional wireless communications system, such as a Global System for Mobile Communications (global system for mobile communication, "GSM" for short) system or a Code Division Multiple Access (code division multiple access, "CDMA" for short) system, "dedicated use" is a major idea of resource allocation. Once a user accesses the system and a resource is allocated to the user, the resource is always occupied by the user, as long as a connection of the user is not interrupted. Therefore, resource usage (such as a power resource) is used to represent a load condition of the system. For example, when transmit power of a base station exceeds 90% of maximum transmit power, a cell load is considered to be high; otherwise, the cell load is considered to be low. In addition, because a resource is for dedicated use, prediction can be performed. That is, it may be predicted, according to a current load condition of the system, how many resources will be occupied by a new user after access.

A traditional method for admission control is to perform admission control mainly based on usage of system resources. First, it is necessary to calculate how many resources have been occupied in the current system, predict how many resources will be additionally occupied after the access of the new user, and finally compare a sum of the two with a preset admission threshold. If the sum of the two is lower than the admission threshold, a service request of the new user is admitted; otherwise, the service request of the new user is denied. However, with evolution of technologies, "sharing" has taken the place of "dedicated use" and become a mainstream of resource allocation. After a user accesses the system, a resource occupied by the user does not remain unchanged any longer, but is determined by a resource scheduling algorithm, allocated on demand, and balanced according to a priority. This makes it increasingly complex to calculate or predict resource usage of the system, and accordingly, it becomes more and more difficult to obtain accurate resource usage and an accurate admission threshold.

SUMMARY

Embodiments of the present invention provide a method and an apparatus for admission control of a wireless communications network, which can effectively improve system capacity of a wireless communications network without requiring complex and inaccurate calculation of resource usage.

The embodiments of the present invention may specifically be implemented through the following technical solutions:

In a first aspect, a communications apparatus is provided and includes:

a processor, configured to: compare waiting time for scheduling of a first service with a first admission threshold, where the first service is a service for which a bearer has been established; if the waiting time for scheduling of the first service is greater than the first admission threshold, compare a satisfaction rate of the first service with a second admission threshold; and if the satisfaction rate of the first service is smaller than the second admission threshold, deny establishment of a bearer for a second service; or if the satisfaction rate of the first service is greater than or equal to the second admission threshold, allow establishment of a bearer for a second service, where the second service is a service for which bearer establishment is requested; and a memory, configured to store data that is required for the processor to perform the foregoing operations.

In a first possible implementation manner of the first aspect, with reference to the first aspect, the processor is further configured to: if the waiting time for scheduling of the first service is smaller than or equal to the first admission threshold, allow establishment of a bearer for the second service.

In a second possible implementation manner of the first aspect, with reference to the first aspect, the processor is further configured to: if the waiting time for scheduling of the first service is smaller than or equal to the first admission threshold, compare system resource usage with a third admission threshold; and if the system resource usage is smaller than or equal to the third admission threshold, allow establishment of a bearer for the second service.

In a third possible implementation manner of the first aspect, with reference to the second possible implementation manner of the first aspect, the processor is further configured to: if the system resource usage is greater than the third admission threshold, compare the satisfaction rate of the first service with the second admission threshold; and if the satisfaction rate of the first service is smaller than the second admission threshold, deny establishment of a bearer for the second service; or if the satisfaction rate of the first service is greater than or equal to the second admission threshold, allow establishment of a bearer for the second service.

In a fourth possible implementation manner of the first aspect, with reference to the first aspect or the first to the third possible implementation manners of the first aspect, the processor is further configured to: before the comparing waiting time for scheduling of a first service with a first admission threshold, differentiate the first service according to quality of service QoS requirements to obtain different service classes, and select a part of or all of the obtained different service classes, so as to compare, for the different service classes, the waiting time for scheduling of the first service with the first admission threshold.

In a fifth possible implementation manner of the first aspect, with reference to the first aspect or the first to the fourth possible implementation manners of the first aspect, the communications apparatus further includes:

a receiver, configured to receive a bearer establishment request, where the bearer establishment request is used to request establishment of a bearer for the second service; and a sender, configured to: if the processor allows establishment of a bearer for the second service, send a bearer establishment allowing response; or, the sender is further configured to: if the processor denies establishment of a bearer for the second service, send a bearer establishment denial response.

In a sixth possible implementation manner of the first aspect, with reference to the first aspect or the first to the fifth possible implementation manners of the first aspect, the communications apparatus is a base station or a network controller on a wireless communications network.

According to the communications apparatus provided in the embodiment of the present invention, system capacity of a wireless communications network can be effectively improved without requiring complex and inaccurate calculation of resource usage.

In a second aspect, a method for admission control of a wireless communications network is further provided and includes:

comparing waiting time for scheduling of a first service with a first admission threshold, where the first service is a service for which a bearer has been established;

if the waiting time for scheduling of the first service is greater than the first admission threshold, comparing a satisfaction rate of the first service with a second admission threshold; and if the satisfaction rate of the first service is smaller than the second admission threshold, denying establishment of a bearer for a second service; or if the satisfaction rate of the first service is greater than or equal to the second admission threshold, allowing establishment of a bearer for a second service, where the second service is a service for which bearer establishment is requested.

In a first possible implementation manner of the second aspect, with reference to the second aspect, the method further includes: if the waiting time for scheduling of the first service is smaller than or equal to the first admission threshold, allowing establishment of a bearer for the second service.

In a second possible implementation manner of the second aspect, with reference to the second aspect, the method further includes: if the waiting time for scheduling of the first service is smaller than or equal to the first admission threshold, comparing system resource usage with a third admission threshold; and if the system resource usage is smaller than or equal to the third admission threshold, allowing establishment of a bearer for the second service.

In a third possible implementation manner of the second aspect, with reference to the second possible implementation manner of the second aspect, the method further includes: if the system resource usage is greater than the third admission threshold, comparing the satisfaction rate of the first service with the second admission threshold; and if the satisfaction rate of the first service is smaller than the second admission threshold, denying establishment of a bearer for the second service; or if the satisfaction rate of the first service is greater than or equal to the second admission threshold, allowing establishment of a bearer for the second service.

In a fourth possible implementation manner of the second aspect, with reference to the second aspect or the first to the third possible implementation manners of the second aspect, the method further includes:

differentiating the first service according to quality of service QoS requirements to obtain different service classes, and selecting a part of or all of the obtained different service classes, so as to compare, for the different service classes, the waiting time for scheduling of the first service with the first admission threshold.

In a fifth possible implementation manner of the second aspect, with reference to the second aspect or the first to the fourth possible implementation manners of the second aspect, the method further includes:

receiving a bearer establishment request, where the bearer establishment request is used to request establishment of a bearer for the second service; and if establishment of a bearer is allowed for the second service, sending a bearer establishment allowing response; or if establishment of a bearer is denied for the second service, sending a bearer establishment denial response.

According to the method for admission control provided in the embodiment of the present invention, system capacity of a wireless communications network can be effectively improved without requiring complex and inaccurate calculation of resource usage.

BRIEF DESCRIPTION OF THE DRAWINGS

FIG. 2-1 to FIG. 2-4 are schematic flowcharts of a method for admission control of a wireless communications network according to embodiments of the present invention;

FIG. 3 is a schematic flowchart of a method for admission control of a wireless communications network according to an embodiment of the present invention;

FIG. 4 is a schematic flowchart of a method for admission control of a wireless communications network according to an embodiment of the present invention;

FIG. 5-1 to FIG. 5-3 are schematic structural diagrams of a communications apparatus according to an embodiment of the present invention; and FIG. 6-1 to FIG. 6-4 are schematic structural diagrams of a communications apparatus according to an embodiment of the present invention.

DETAILED DESCRIPTION

To make the objectives, technical solutions, and advantages of the present invention more comprehensible, the following further describes the technical solutions of the present invention in detail with reference to the accompanying drawings and specific embodiments.

The technical solutions provided in the embodiments of the present invention can be applied to a wireless communications network on which resources are "shared" through a resource scheduling algorithm, including but not limited to: a Universal Mobile Telecommunication System (universal mobile telecommunication system, "UMTS" for short) system, a Long Term Evolution (long term evolution, "LTE" for short) system, a Long Term Evolution advanced (long term evolution advanced, "LTE-A" for short) system, a Worldwide Interoperability for Microwave Access (worldwide interoperability for microwave access, "WiMAX" for short) system, a Ultra-Mobile Broadband (ultra-mobile broadband, "UMB" for short) system, and the like. The terms "network" and "system" can be interchanged with each other.

Figure 1:
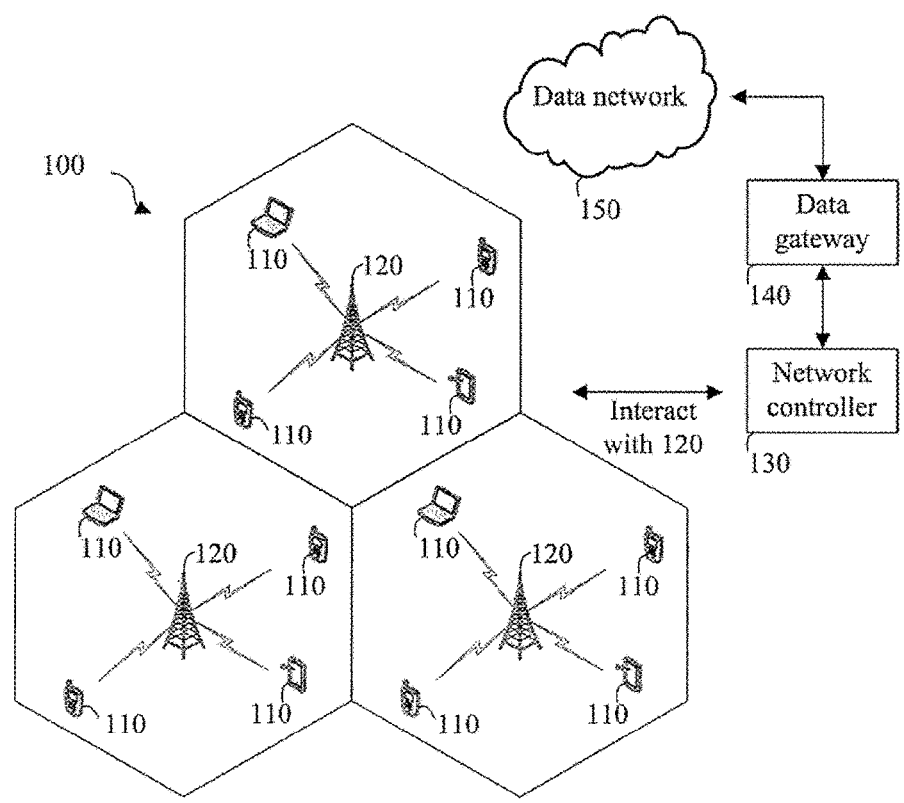
FIG. 1 is a schematic structural diagram of a wireless communications network according to an embodiment of the present invention.

FIG. 1 is a schematic structural diagram of a wireless communications network 100 according to an embodiment of the present invention. As shown in FIG. 1, the wireless communications network 100 includes at least one base station (base station, "BS" for short) 120. The base station may be a device that communicates with a user equipment (user equipment, "UE" for short) or another communications station, such as a relay station. The base station may provide communications coverage for a specific geographical area. For example, the base station may specifically be a NodeB (Node B, "NB" for short) in UMTS; or may be an evolved NodeB (Evolutional Node B, "ENB" or "eNode B" for short) in LTE or LTE-A; or may be another access network device that provides an access service on a wireless communications network, which is not limited in this embodiment of the present invention.

The wireless communications network 100 may further include a network controller 130 and a data gateway 140. The network controller 130 is capable of exchanging information with the base stations, and provides coordination and control for these base stations. For example, the network controller may be a radio network controller (radio network controller, "RNC" for short) of UMTS. The data gateway 140 is capable of supporting a data service of a UE, and is responsible for establishing, maintaining, and terminating a data session of the UE. The data gateway 140 is capable of exchanging information with a data network 150. The data network may include but is not limited to: a core network (core network, "CN" for short), a private or public data network, a packet data network (packet data network, "PDN" for short), or the Internet (internet).

In this embodiment of the present invention, UEs 110 may be distributed on the entire wireless communications network, and each UE may be static or moving. A UE may be called a terminal (terminal), a mobile station (mobile station), a subscriber unit (subscriber unit), a station (station), or the like. For example, the UE may specifically be a cellular phone (cellular phone), a personal digital assistant (personal digital assistant, PDA for short), a wireless modem (modem), a wireless communications device, a handheld device (handheld), a laptop computer (laptop computer), a cordless phone (cordless phone), or the like. The UE is capable of communicating with a base station through an upstream link or a downstream link. The upstream link (or a reverse link) refers to a communications link from the UE to the base station, and the downstream link (or a forward link) refers to a communications link from the base station to the UE. In subsequent description, the terms "UE" and "user" or "service" may be interchanged with each other according to a context environment.

In the prior art, a radio resource management (radio resource management, "RRM" for short) functional entity is usually located in a base station or a network controller. For example, before an R99 version of a Wideband Code Division Multiple Access (wideband code division multiple access, "WCDMA" for short) system, an RRM functional entity is located in an RNC; and after an R5 version in which high speed downlink packet access (high speed downlink packet access, "HSDPA" for short) is launched, apart of RRM functional entities are moved downward to base stations (Node B) to improve a response speed of control. In an LTE or LTE-A system, an RRM functional entity is located in a base station (eNode B).

Using an LTE system as an example, when data transmission is required, a UE can send a service request (service request) message to a core network device, such as a mobility management entity (mobility management entity, "MME" for short), through an eNode B; the MME can send a bearer establishment request, which is used to request establishment of a bearer, to the eNode B to allocate a radio resource to the UE; and after receiving the bearer establishment request, the eNode B can perform a method for admission control, so as to determine whether to establish a bearer for the UE. If the eNode B determines to establish a bearer for the UE, the eNode B can send an RRC connection reconfiguration message to the UE, establishes a radio bearer for the UE, and sends a bearer establishment response to the MME. The following describes in detail a method and an apparatus for admission control according to the embodiments of the present invention.

Figures 1, 2:
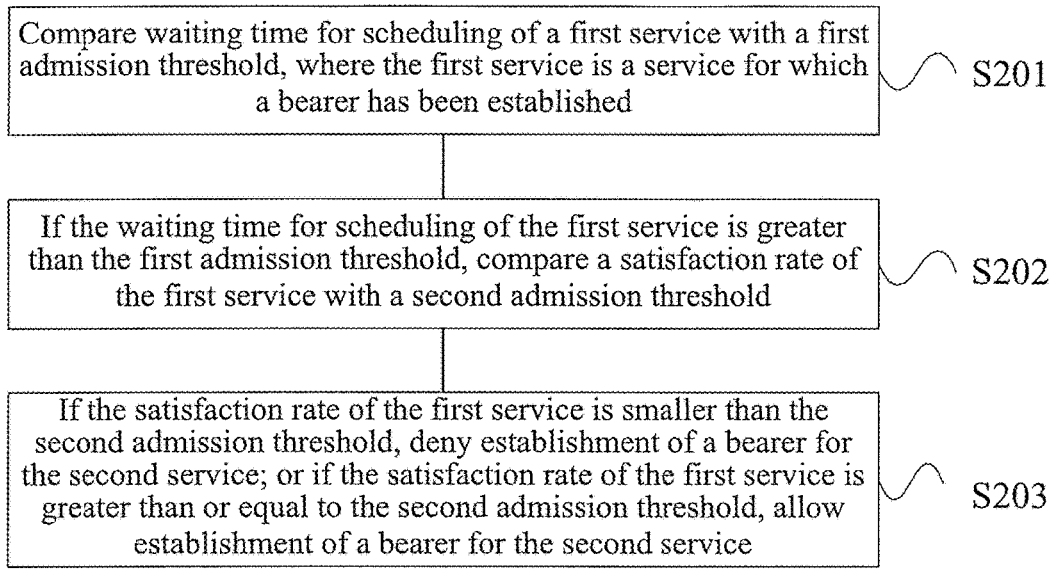
Figure 2:
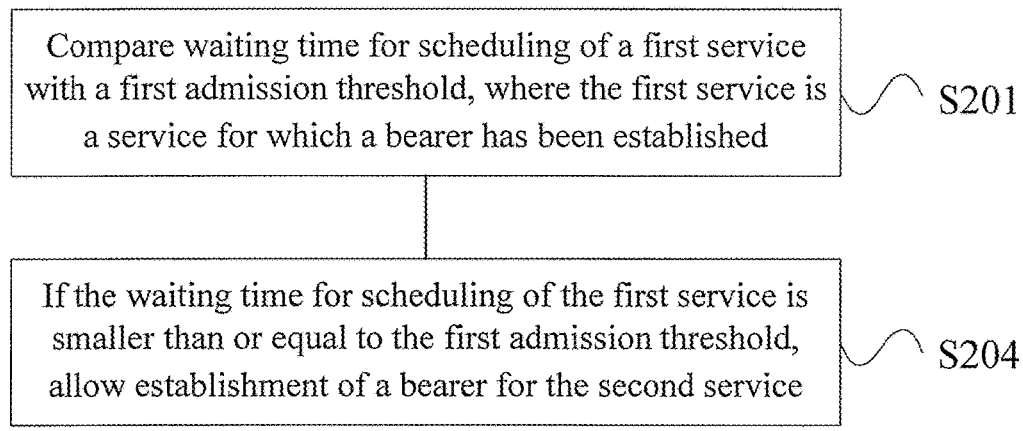

FIG. 2-1 is a schematic flowchart of a method for admission control according to an embodiment of the present invention. As shown in FIG. 2-1, this embodiment of the present invention may include the following steps:

Step S201: Compare waiting time for scheduling of a first service with a first admission threshold, where the first service is a service for which a bearer has been established.

The establishment of the bearer may indicate establishment of a radio access bearer (radio access bearer, "RAB" for short), may also indicate establishment of an evolved radio access bearer (E-UTRAN radio access bearer, "E-RAB" for short), and may further indicate another approach of providing a service with a resource. The waiting time for scheduling of the first service may be defined as a time interval from time when the first service applies for a resource to be scheduled to time when the first service obtains the scheduled resource. Using an LTE system as an example, in an uplink direction, the waiting time for scheduling of the first service may include: a time interval from time when a random access request (random access request) reported by a UE is received to time when a scheduled resource for uplink new transmission (new transmission) is allocated to the UE; or a time interval from time when a scheduling request (scheduling request) reported by a UE is received to time when a scheduled resource for uplink new transmission is allocated to the UE; or a time interval from time when a buffer status report (buffer status reporting) reported by a UE is received to time when a scheduled resource for uplink new transmission is allocated to the UE. In a downlink direction, the waiting time for scheduling of the first service may be a time interval from time when a downlink data packet is received from an S1-U interface to time when a scheduled resource for new transmission is allocated to the data packet. The scheduled resource for new transmission may include a common control channel (common control channel, "CCE" for short) resource or a resource block (resource block, "RB" for short) of a physical downlink control channel (physical downlink control channel, "PDCCH" for short).

The comparing waiting time for scheduling of a first service with a first admission threshold may specifically include: predefining a comparison period, collecting the waiting time for scheduling of the first service in the comparison period, and comparing the collected waiting time for scheduling of the first service with the first admission threshold to obtain three cases in which the waiting time for scheduling of the first service is greater than, equal to, or smaller than the first admission threshold. The first admission threshold may be a preset time value.

For example, if there is only one first service in the statistical period, the waiting time for scheduling of the first service may be directly compared with the first admission threshold. If there are multiple first services in the statistical period, the comparing waiting time for scheduling of a first service with a first admission threshold may specifically be performed by using any one or more of the following schemes:

Scheme 1: Perform statistical processing on waiting time for scheduling of the multiple first services, where the waiting time for scheduling of the multiple first services is obtained through statistics collecting, so as to obtain a single waiting time for scheduling of a first service, and compare the single waiting time for scheduling of a first service with the first admission threshold to obtain the three cases in which the waiting time for scheduling of the first service is greater than, equal to, or smaller than the first admission threshold. The statistical processing may include but is not limited to the following operations: getting an average value, getting a maximum value, and getting a weighted sum.

Scheme 2: Compare waiting time for scheduling of each first service with the first admission threshold, collect statistics on the number of times that the waiting time for scheduling of the first service is greater than the first admission threshold in the comparison period, and consider that the waiting time for scheduling of the first service is greater than the first admission threshold if the number of times is greater than a preset number of times, or otherwise consider that the waiting time for scheduling of the first service is smaller than or equal to the first admission threshold.

Scheme 3: Compare waiting time for scheduling of each first service with the first admission threshold, collect statistics on a proportion of waiting time for scheduling of all the first services that is greater than the first admission threshold in the comparison period, and consider that the waiting time for scheduling of the first service is greater than the first admission threshold if the ratio is greater than a preset proportion, or otherwise consider that the waiting time for scheduling of the first service is smaller than or equal to the first admission threshold.

It should be understood that the first service may be classified according to quality of service (quality of service, "QoS" for short) requirements to obtain different service classes. The service classes may also be called QoS classes, flow classes, service categories, service categories, or the like. Different service classes may correspond to different QoS requirements. For example, in an LTE system, a class of a service may be differentiated according to a QoS class identifier (QoS class identifier, "QCI" for short) of a bearer of the service, and different QCI values may correspond to different processing priorities, acceptable delay budgets, packet loss rates, or the like. For example, the first service may specifically be classified, according to different QoS requirements, into a total of five service classes, which are a voice service, a streaming service, a highly-delay-sensitive interactive service, a guaranteed-rate service, and a best-effort service.

Optionally, step S201 may further include: before the comparing waiting time for scheduling of a first service with a first admission threshold, differentiating the first service according to quality of service QoS requirements to obtain different service classes, and selecting a part of or all of the obtained different service classes, so as to compare, for the different service classes, the waiting time for scheduling of the first service with the first admission threshold. Correspondingly, numerical values of the statistical period and the first admission threshold may be determined according to experience, and may also be adjusted according to a service class of the first service. For example, for a service with different time delay requirements, the first admission threshold may be the same as or close to an acceptable delay budget of the service. For example, the first admission threshold of a VoIP (voice over internet protocol) service may be set to 100 milliseconds (millisecond, "ms" for short). It should be noted that the foregoing numerical values are for exemplary description only, and during specific implementation, other numerical values may also be used, and this is not limited in this embodiment of the present invention.

Step S202: If the waiting time for scheduling of the first service is greater than the first admission threshold, compare a satisfaction rate of the first service with a second admission threshold, where the second admission threshold may be a preset satisfaction rate threshold.

For the first services of different service classes, methods for calculating corresponding satisfaction rates may include multiple different calculation methods, respectively. The following gives exemplary description in combination with the first services of the foregoing five different service classes, respectively, which are the voice service, the streaming service, the highly-delay-sensitive interactive service, the guaranteed-rate service, and the best-effort service.

1. Voice Service

Speech quality of voice services may be expressed by a mean opinion score (main opinion score, "MOS" for short). For example, in the prior art, by using a method of perceptual evaluation of speech quality (perceptual evaluation of speech quality, "PESQ" for short) stipulated in ITU-T P.862 and an E-Model stipulated in ITU-T G.107, this work can be implemented. For voice services, the following methods may be used to calculate a satisfaction rate of the voice services:

(1) When an MOS value of a voice service exceeds a value of a preset score, the voice service is considered to be satisfactory; otherwise, the voice service is considered to be dissatisfactory. A specific value of the preset score may be set according to an actual requirement. Therefore, the satisfaction rate of the voice services may be obtained by using the following method. That is, the satisfaction rate of the voice services is a ratio of the number of satisfactory voice services to the total number of voice services, and may be:

Satisfaction rate of the voice services=(Number of satisfactory voice services)/(Total number of voice services)

(2) A sum of MOS scores of weighted voice services may be obtained according to a weight that corresponds to each voice service. Then the satisfaction rate of the voice services is a ratio of the sum of the MOS scores of the weighted voice services to a sum of the weight, and for example, may be obtained by using the following method:

$$S_{voice} = \frac{\sum (W_i \times MOS_i)}{\sum W_i}$$

where $S_{voice}$ is the satisfaction rate of the voice services, $MOS_i$ is an MOS score value of an $i$th voice service, and $W_i$ is a weight of the $i$th voice service.

(3) A UE reports whether the UE is satisfied with a current voice service, and then a satisfaction rate of the voice service is obtained through calculation according to a reporting result. The reporting result of the UE may include a parameter indicating whether the voice service is satisfactory. Then the satisfaction rate of the voice services is a ratio of the number of satisfactory voice services to the total number of users of the voice services, and may be:

Satisfaction rate of the voice services=(Number of satisfactory voice services)/(Total number of voice services)

2. Streaming Service

Currently, a streaming service generally refers to a video streaming service, and similar processing may be performed for other streaming services. In the prior art, usually a peak signal-to-noise ratio (Peak Signal to Noise Ratio, "PSNR" for short) is used to evaluate quality of a streaming service. The following methods may be used to calculate a satisfaction rate of streaming services:

(1) When a PSNR reaches a preset numerical value, satisfaction is considered; otherwise, dissatisfaction is considered. Therefore, the satisfaction rate of the streaming services may be obtained according to a ratio of the number of satisfactory streaming services to the total number of streaming services, for example:

Satisfaction rate of the streaming services=(Number of satisfactory streaming services)/(Total number of streaming services)

The preset numerical value may be set according to an actual requirement.

(2) A sum of peak signal-to-noise ratios of weighted streaming services may be determined according to a weight that corresponds to each streaming service. Then the satisfaction rate of the streaming services is a ratio of the sum of the peak signal-to-noise ratios of the weighted streaming services to a sum of the weight of each streaming service, and for example, may be obtained by using the following method:

$$S_{video} = \frac{\sum (W_i \times PSNR_i)}{\sum W_i}$$

where $S_{video}$ is the satisfaction rate of the streaming services, $PSNR_i$ is a PSNR of an $i$th streaming service, and $W_i$ is a weight of the $i$th streaming service.

(3) A UE reports whether the UE is satisfied with a current streaming service, and then a satisfaction rate of the streaming service is calculated according to a reporting result. The reporting result of the UE may include a parameter indicating whether the streaming service is satisfactory. Then the satisfaction rate of the streaming services is a ratio of the number of satisfactory streaming services to the total number of users of the streaming services, and may be:

Satisfaction rate of the streaming services=(Number of satisfactory streaming services)/(Total number of streaming services)

3. Highly-Delay-Sensitive Interactive Service

The following methods may be used to calculate a satisfaction rate of highly-delay-sensitive interactive services:

(1) Highly-delay-sensitive interactive services pose a very high delay requirement, and a network also has a time requirement for data packet buffering of these services. Once a data packet is not correctly transmitted within specified time, the data packet is discarded and no longer transmitted. A system monitors packet loss of the highly-delay-sensitive interactive services. As long as it is discovered, within specified time T before an admission decision time point, that K times of packet loss occur due to timeout, dissatisfaction is considered; otherwise, satisfaction is considered. The time T and the number K of times of packet loss may be set according to a degree of delay tolerance of an actual service. Then the satisfaction rate of the highly-delay-sensitive interactive services is a ratio of the number of satisfactory highly-delay-sensitive interactive services to the total number of highly-delay-sensitive interactive services, and may be:

Satisfaction rate of the highly-delay-sensitive interactive services=(Number of satisfactory highly-delay-sensitive interactive services)/(Total number of highly-delay-sensitive interactive services)

(2) A UE reports whether the UE is satisfied with a current highly-delay-sensitive interactive service, and then a satisfaction rate of the highly-delay-sensitive interactive service is calculated according to a reporting result. The reporting result of the UE may include a parameter indicating whether the highly-delay-sensitive interactive service is satisfactory. Then the satisfaction rate of the highly-delay-sensitive interactive services is a ratio of the number of satisfactory highly-delay-sensitive interactive services to the total number of users of the highly-delay-sensitive interactive services, and may be:

Satisfaction rate of the highly-delay-sensitive interactive services=(Number of satisfactory highly-delay-sensitive interactive services)/(Total number of users of the highly-delay-sensitive interactive services)

4. Guaranteed-Rate Service

All guaranteed-rate services have a GBR (Guaranteed Bit Rate) attribute, which indicates a guaranteed bit rate, and therefore are also called GBR services. The following methods may be used to calculate a satisfaction rate of the GBR services:

(1) The satisfaction rate of the GBR services is determined according to a weighted total dissatisfaction rate of the GBR services, for example:

$$S_{GBR} = 100\% - \frac{\sum \left(W_i \times \frac{D_i}{GBR_i}\right)}{\sum W_i}$$

where $S_{GBR}$ is the satisfaction rate (which may be expressed in percentage) of the GBR services, $D_i$ is a GBR rate difference of an $i$th GBR service whose buffer queue is not null, $GBR_i$ is a GBR rate of the $i$th GBR service, and $W_i$ is a weight of the $i$th GBR service whose buffer queue is not null. In this method, a dissatisfaction rate (that is, a ratio of a GBR rate difference to a GBR rate) of each GBR service for which there is data to be transmitted is first derived, then a weighted average total dissatisfaction rate is obtained, and the satisfaction rate of the GBR services is further deduced.

A method for calculating $D_i$ is as follows:

$$D_i = \begin{cases} 0, R \geq GBR_i \\ GBR_i - R_i, R_i < GBR_i \end{cases}$$

where $R_i$ is throughput of the $i$th GBR service statistically measured in a period of time. That is to say, when throughput of a GBR service statistically measured in a period of time is higher than or equal to the GBR rate, the service is satisfactory and the GRB rate difference is 0; or when throughput of a GBR service statistically measured in a period of time is smaller than the GBR rate, the GBR rate difference is obtained according to this method in this embodiment.

(2) When throughput of a GBR service in a period of time is greater than or equal to the GBR, the GBR service is considered to be satisfactory; otherwise, the GBR service is considered to be dissatisfactory. Therefore, the satisfaction rate of the GBR services is a ratio of the number of satisfactory GBR services to the total number of GBR services, and may be:

Satisfaction rate of the GBR services=(Number of satisfactory GBR services)/(Total number of GBR services)

(3) A UE reports whether the UE is satisfied with a current guaranteed-rate service, and then a satisfaction rate of the guaranteed-rate service is calculated according to a reporting result. The reporting result of the UE may include a parameter indicating whether the GBR service is satisfactory. Then the satisfaction rate of the GBR services is a ratio of the number of satisfactory GBR services to the total number of users of the GBR services, and may be:

Satisfaction rate of the guaranteed-rate services= (Number of satisfactory guaranteed-rate services)/(Total number of guaranteed-rate services)

5. Best-Effort Service

A best-effort service is a service available only when a system has an idle resource. This type of services has neither a delay requirement nor a guaranteed-rate requirement. Anon-zero minimum rate (Minimum Bit Rate, "MinBR" for short) is introduced to facilitate quality evaluation. The rate is defined as a least MinBR rate provided for each best-effort service when data needs to be transmitted for all best-effort services, and at this time the best-effort services are considered to be satisfactory. The following methods may be used to calculate a satisfaction rate of the best-effort services:

(1) When an average rate of all best-effort services for which data needs to be transmitted exceeds the MinBR, the satisfaction rate is 100%; otherwise, the satisfaction rate is a ratio of the average rate to the MinBR, and the satisfaction rate of the best-effort services may be obtained according to the following method:

$$S_{Non-GBR} = \begin{cases} 100\%, & \sum R_i \geq MinBR \times Sum_{Non-GBR} \\ \dfrac{\sum R_i}{MinBR \times Sum_{Non-GBR}}, & \sum R_i < MinBR \times Sum_{Non-GBR} \end{cases}$$

where, $S_{Non-GBR}$ is the satisfaction rate of the best-effort services, $R_i$ is throughput of an $i$th best-effort service whose buffer queue is not null, where the throughput of the $i$th best-effort service is statistically measured in a period of time, and $Sum_{Non-GBR}$ is the total number of best-effort services whose buffer queue is not null.

(2) When throughput of a best-effort service in a period of time is greater than or equal to the MinBR, the best-effort service is considered to be satisfactory; otherwise, the best-effort service is considered to be dissatisfactory. Then the satisfaction rate of the best-effort services is a ratio of the number of satisfactory best-effort services to the total number of best-effort services, and may be:

Satisfaction rate of the best-effort services=(Number of satisfactory best-effort services)/(Total number of best-effort services)

(3) A UE reports whether the UE is satisfied with a current best-effort service, and then a satisfaction rate of the best-effort service is calculated according to a reporting result. The reporting result of the UE may include a parameter indicating whether the best-effort service is satisfactory. Then the satisfaction rate of the best-effort services is a ratio of the number of satisfactory best-effort services to the total number of users of the best-effort services, and may be:

Satisfaction rate of the best-effort services=(Number of satisfactory best-effort services)/(Total number of best-effort services)

Step S203: If the satisfaction rate of the first service is smaller than the second admission threshold, deny establishment of a bearer for a second service; or if the satisfaction rate of the first service is greater than or equal to the second admission threshold, allow establishment of a bearer for a second service, where the second service is a service for which bearer establishment is requested. Specifically, the second service may be a new service for which the bearer establishment is requested, and may also be a handover service for which the bearer establishment is requested.

In the prior art, a method for admission control based on a service satisfaction rate is provided. If a satisfaction rate of an accessed service is greater than or equal to an admission threshold, a new service request is admitted; otherwise, the new service request is denied, thereby avoiding complex and inaccurate calculation or prediction of resource usage. However, during actual running of a system, a low service satisfaction rate mainly includes: a low service satisfaction rate caused by resource restriction, a low service satisfaction rate caused by poor channel quality, and a low service satisfaction rate caused by user equipment UE capability (such as uplink power) restriction. The low service satisfaction rate caused by poor channel quality or UE capability restriction does not mean that resource usage of the system is high. In this case, if merely the method for admission control based on the service satisfaction rate is used, a new service request is mistakenly denied, thereby causing a decrease in system capacity. For a purpose of avoiding this problem, the resource usage of the system may be further checked before the service satisfaction rate is determined, but this violates the original intention of avoiding complex and inaccurate calculation of resource usage.

In the method for admission control according to this embodiment of the present invention, waiting time for scheduling of a service, for which a bearer has been established, is creatively introduced as a decision condition for admission control. On a wireless communications network on which currently resources are "shared" by using a resource scheduling algorithm, when system resource usage is relatively high, a user needs to be queued to wait for scheduling and correspondingly waiting time for scheduling becomes long; and when the system resource usage is relatively low, the user can be scheduled in a timely manner, and the waiting time for scheduling is still relatively short even if there exists a scenario in which air interface channel quality is poor or UE capability is restricted. That is, a length of the waiting time for scheduling can serve as an indicator that represents whether a system resource is restricted. Therefore, according to the method for admission control provided in this embodiment of the present invention, system capacity of the wireless communications network can be effectively improved without requiring complex and inaccurate calculation of resource usage.

Optionally, as shown in FIG. 2-2, a method for admission control according to an embodiment of the present invention may further include the following step, in addition to step S201:

Step S204: If the waiting time for scheduling of the first service is smaller than or equal to the first admission threshold, allow establishment of a bearer for the second service.

Figures 2, 3:
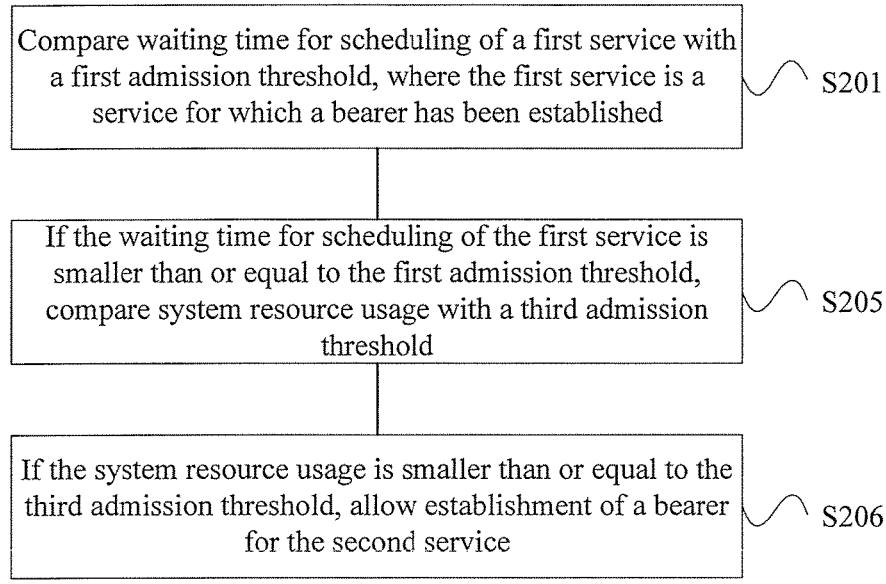

Optionally, as shown in FIG. 2-3, a method for admission control according to an embodiment of the present invention may further include the following steps, in addition to step S201:

Step S205: If the waiting time for scheduling of the first service is smaller than or equal to the first admission threshold, compare system resource usage with a third admission threshold.

Step S206: If the system resource usage is smaller than or equal to the third admission threshold, allow establishment of a bearer for the second service.

In the method for admission control according to this optional embodiment, when the waiting time for scheduling of the first service is smaller than or equal to the first admission threshold, further comparing the system resource usage with the third admission threshold is still required. It should be noted that although it is quite complex to calculate the system resource usage and accuracy cannot be ensured, calculating the system resource usage can still serve as a supplementary decision condition for admission control. For example, when the decision condition for admission control based on waiting time for scheduling is invalid for some unpredictable reasons, comparing the system resource usage with the third admission threshold may serve as an alternative decision condition for admission control, thereby enhancing robustness of the method for admission control.

Figures 2, 3, 4:
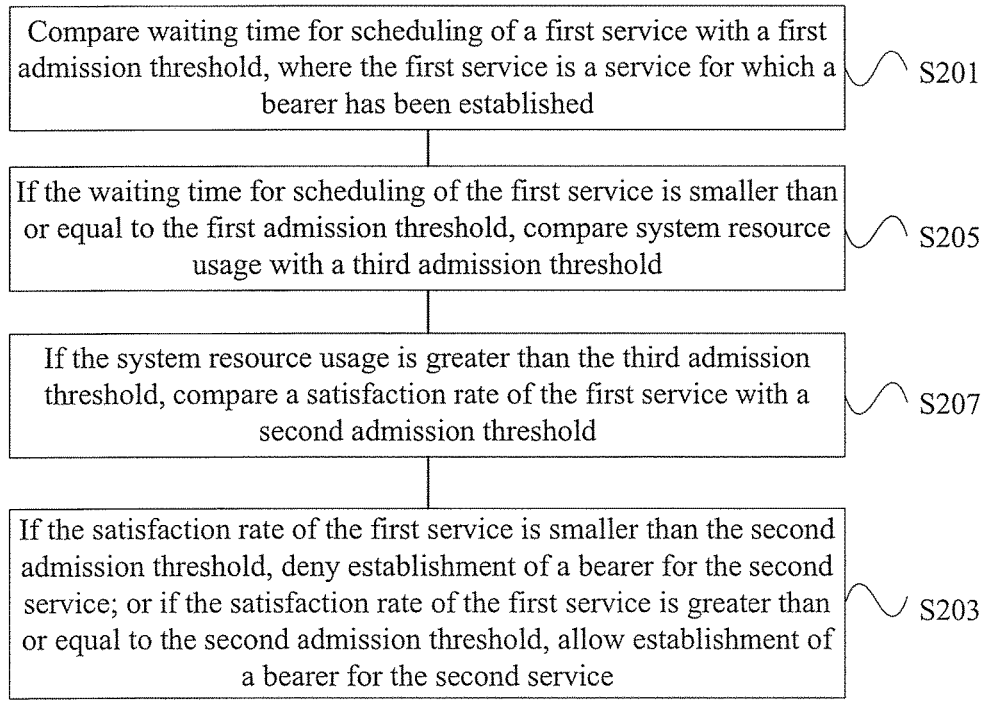
Figure 3:
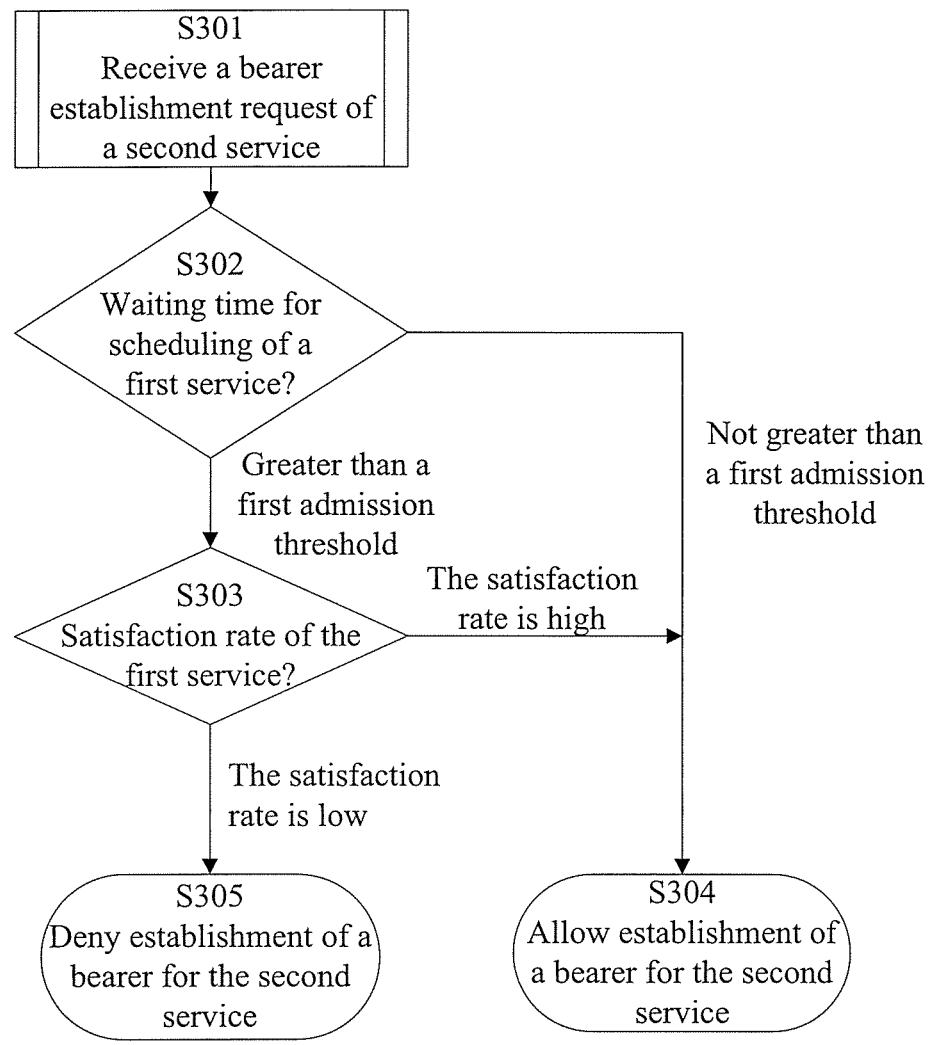
Figure 4:
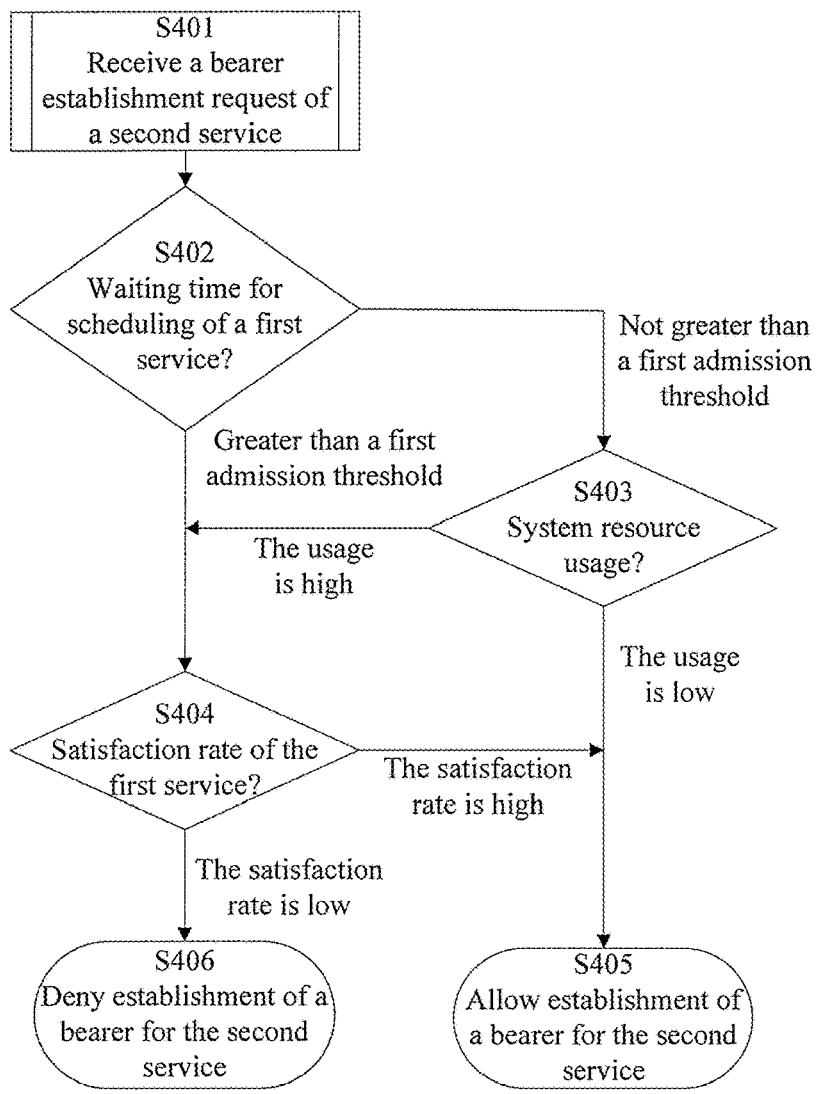

Optionally, as shown in FIG. 2-4, a method for admission control according to an embodiment of the present invention may further include the following steps, in addition to steps S201 and S205:

Step S207: If the system resource usage is greater than the third admission threshold, compare a satisfaction rate of the first service with a second admission threshold.

Step S203: If the satisfaction rate of the first service is smaller than the second admission threshold, deny establishment of a bearer for the second service; or if the satisfaction rate of the first service is greater than or equal to the second admission threshold, allow establishment of a bearer for the second service.

In the method for admission control according to this optional embodiment, when the system resource usage is greater than the third admission threshold, the satisfaction rate of the first service continues to be compared with the second admission threshold, so as to avoid a case of admission denial caused by inaccurate calculation of the system resource usage, thereby improving system capacity of a wireless communications network.

Optionally, the methods for admission control according to the embodiments shown in FIG. 2-1 and FIG. 2-4 may further include the following optional technical solution:

receiving a bearer establishment request, where the bearer establishment request is used to request the establishment of the bearer for the second service; and if the establishment of the bearer is allowed for the second service, sending a bearer establishment allowing response; or if the establishment of the bearer is denied for the second service, sending a bearer establishment denial response.

Optionally, for two cases in which the second service is a new service and the second service is a handover service, a same admission threshold may be used, or different admission thresholds may be used. For example, an admission threshold lower than an admission threshold of the new service may be set for the handover service. That is to say, for services of a same QoS category, there exists a case in which a handover service is admitted but a new service is denied, so as to ensure that the handover service may be preferentially admitted.

In addition, for the second service of different priority levels, different admission thresholds may also be used. For example, an admission threshold of a Gold (high-priority) user may be set to be lower than that of a Copper (low-priority) user. That is, for services of a same QoS category, there exists a case in which a Gold service is admitted but a Copper service is denied. In this way, it may be ensured that a service with a relatively high priority is easily admitted, thereby implementing differentiated services for services of different priorities.

Further, from an angle of compatibility, in the method for admission control according to the foregoing embodiments, a resource restriction indicator generated by another module may further be received. When the resource restriction indicator, such as a license restriction indicator, is received, a new service or a handover service cannot be admitted, even if a satisfaction rate of a service is 100%.

FIG. 3 is a schematic flowchart of a method for admission control according to an embodiment of the present invention. As shown in FIG. 3, this embodiment of the present invention may include the following steps:

Step S301: Receive a bearer establishment request of a second service, where the bearer establishment request is used to request establishment of a bearer for the second service. Specifically, the second service may be a new service for which the bearer establishment is requested, and may also be a handover service for which the bearer establishment is requested.

Step S302: Determine whether waiting time for scheduling of a first service is greater than a first admission threshold.

If the waiting time for scheduling of the first service is greater than the first admission threshold, step S303 is executed; or if the waiting time for scheduling of the first service is smaller than or equal to the first admission threshold, step S304 is executed.

Step S303: Determine whether a satisfaction rate of the first service is high or low.

For example, the satisfaction rate of the first service may be compared with a second admission threshold. If the satisfaction rate of the first service is greater than or equal to the second admission threshold, the satisfaction rate of the first service is considered to be high and step S304 is executed; or if the satisfaction rate of the first service is smaller than the second admission threshold, the satisfaction rate of the first service is considered to be low and step S305 is executed.

Step S305: Deny establishment of a bearer for the second service.

Step S304: Allow establishment of a bearer for the second service.

The method for admission control according to the embodiment shown in FIG. 3 is a combination of the methods for admission control according to the embodiments shown in FIG. 2-1 and FIG. 2-2. For specific content, reference may be made to the description of the embodiments shown in FIG. 2-1 and FIG. 2-2, and details are not repeatedly described herein. According to the method for admission control provided in this embodiment of the present invention, system capacity of a wireless communications network can be effectively improved without requiring complex and inaccurate calculation of resource usage.

FIG. 4 is a schematic flowchart of a method for admission control according to an embodiment of the present invention. As shown in FIG. 4, this embodiment of the present invention may include the following steps:

Step S401: Receive a bearer establishment request of a second service, where the bearer establishment request is used to request establishment of a bearer for the second service. Specifically, the second service may be a new service for which the bearer establishment is requested, and may also be a handover service for which the bearer establishment is requested.

Step S402: Determine whether waiting time for scheduling of a first service is greater than a first admission threshold.

If the waiting time for scheduling of the first service is smaller than or equal to the first admission threshold, step S403 is executed; or if the waiting time for scheduling of the first service is greater than the first admission threshold, step S404 is executed.

Step S403: Check whether system resource usage is high or low.

For example, the system resource usage may be compared with a third admission threshold. If the system resource usage is greater than the third admission threshold, the system resource usage is considered to be high and step S404 is executed; or if the system resource usage is smaller than or equal to the third admission threshold, the system resource usage is considered to be low and step S405 is executed.

Step S404: Determine whether a satisfaction rate of the first service is high or low.

For example, the satisfaction rate of the first service may be compared with a second admission threshold. If the satisfaction rate of the first service is greater than or equal to the second admission threshold, the satisfaction rate of the first service is considered to be high and step S405 is executed; or if the satisfaction rate of the first service is smaller than the second admission threshold, the satisfaction rate of the first service is considered to be low and step S406 is executed.

Step S405: Allow establishment of a bearer for the second service.

Step S406: Deny establishment of a bearer for the second service.

The method for admission control according to the embodiment shown in FIG. 4 is a combination of the methods for admission control according to the embodiments shown in FIG. 2-1 to FIG. 2-4. For detailed content, reference may be made to the description of the embodiments shown in FIG. 2-1 to FIG. 2-4, and details are not repeatedly described herein. According to the method for admission control provided in this embodiment of the present invention, on one hand, system capacity of a wireless communications network can be effectively improved without requiring complex and inaccurate calculation of resource usage; and on the other hand, when a decision condition for admission control based on waiting time for scheduling is invalid for some unpredictable reasons, checking system resource usage may serve as an alternative decision condition for admission control, thereby enhancing robustness of the method for admission control.

Figures 1, 5:
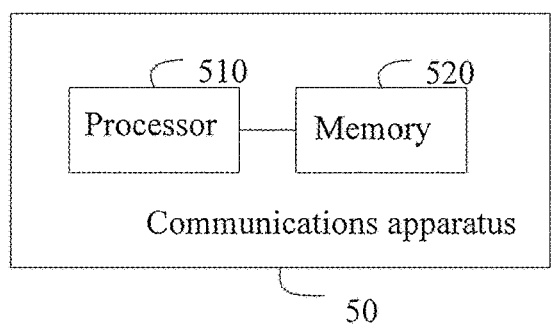
Figures 2, 5:
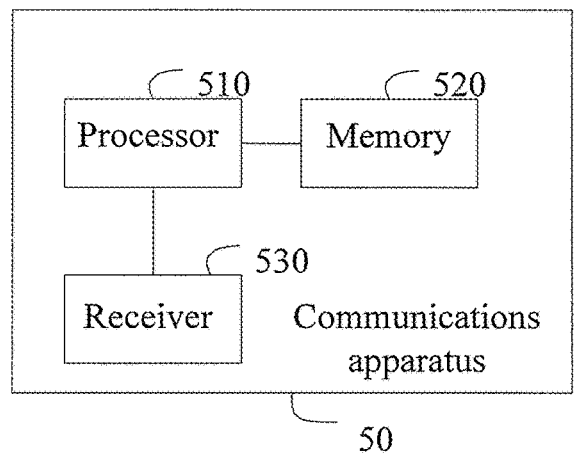
Figures 3, 5:
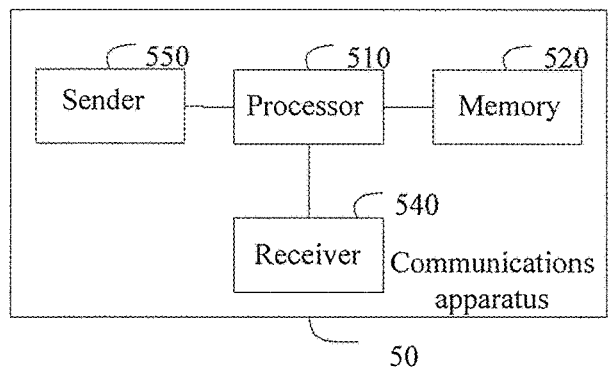

FIG. 5-1 is a schematic structural diagram of a communications apparatus 50 according to an embodiment of the present invention. As shown in FIG. 5-1, the communications apparatus 50 includes:

a processor 510, configured to: compare waiting time for scheduling of a first service with a first admission threshold, where the first service is a service for which a bearer has been established; if the waiting time for scheduling of the first service is greater than the first admission threshold, compare a satisfaction rate of the first service with a second admission threshold; and if the satisfaction rate of the first service is smaller than the second admission threshold, deny establishment of a bearer for a second service; or if the satisfaction rate of the first service is greater than or equal to the second admission threshold, allow establishment of a bearer for a second service, where the second service is a service for which bearer establishment is requested; and a memory 520, configured to store data that is required for the processor 510 to perform the foregoing operations. For example, the memory 520 may be configured to store one or more of the following data: the waiting time for scheduling of the first service, the first admission threshold, the satisfaction rate of the first service, and the second admission threshold.

On a basis of the communications apparatus 50 according to the embodiment shown in FIG. 5-1, optionally, the processor 510 may further be configured to: before the comparing waiting time for scheduling of a first service with a first admission threshold, differentiate the first service according to quality of service QoS requirements to obtain different service classes, and select apart of or all of the obtained different service classes, so as to compare, for the different service classes, the waiting time for scheduling of the first service with the first admission threshold.

Optionally, the processor 510 may further be configured to: if the waiting time for scheduling of the first service is smaller than or equal to the first admission threshold, allow the establishment of the bearer for the second service.

Optionally, the processor 510 may further be configured to: if the waiting time for scheduling of the first service is smaller than or equal to the first admission threshold, compare system resource usage with a third admission threshold; and if the system resource usage is smaller than or equal to the third admission threshold, allow the establishment of the bearer for the second service.

Optionally, the processor 510 may further be configured to: if the system resource usage is greater than the third admission threshold, compare the satisfaction rate of the first service with the second admission threshold; and if the satisfaction rate of the first service is smaller than the second admission threshold, deny the establishment of the bearer for the second service; or if the satisfaction rate of the first service is greater than or equal to the second admission threshold, allow the establishment of the bearer for the second service.

Optionally, on a basis of the communications apparatus 50 according to the embodiment shown in FIG. 5-1, as shown in FIG. 5-2, the communications apparatus 50 may further include:

a receiver 530, configured to receive a resource restriction indicator generated by another module. When the resource restriction indicator, such as a license restriction indicator, is received, a new service or a handover service cannot be admitted, even if a satisfaction rate of a service is 100%.

Optionally, on a basis of the communications apparatus 50 according to the embodiment shown in FIG. 5-1, as shown in FIG. 5-3, the communications apparatus 50 may further include:

a receiver 540, configured to receive a bearer establishment request, where the bearer establishment request is used to request the establishment of the bearer for the second service; and a sender 550, configured to: if the processor 510 allows the establishment of the bearer for the second service, send a bearer establishment allowing response; or, the sender 550 is further configured to: if the processor 510 denies the establishment of the bearer for the second service, send a bearer establishment denial response.

On a basis of the communications apparatus 50 according to the embodiment shown in FIG. 5-2, the receiver 540 and the receiver 530 may be a same receiver.

Optionally, the communications apparatus 50 may be the base station 120 or the network controller 130 on the wireless communications network 100 shown in FIG. 1. For example, the communications apparatus 50 may be an RNC in a UMTS system, or an eNode B in an LTE system.

According to the communications apparatus 50 provided in this embodiment of the present invention, the method for admission control provided in any one of the embodiments shown in FIG. 2-1 to FIG. 2-4, FIG. 3, and FIG. 4 may be implemented. For content not described herein in detail, reference may be made to the description of the foregoing method embodiments. When the communications apparatus 50 is used, system capacity of a wireless communications network can be effectively improved without requiring complex and inaccurate calculation of resource usage.

Figures 1, 6:
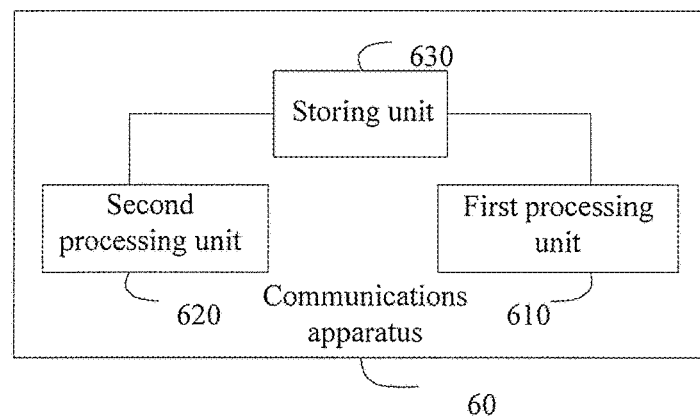
Figures 2, 6:
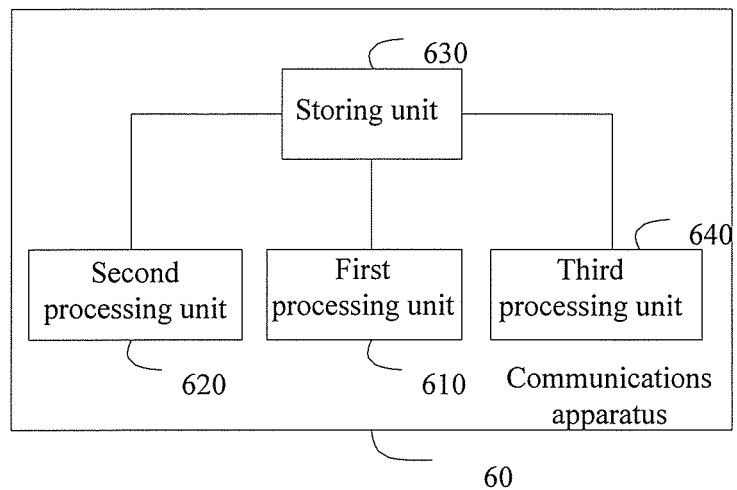
Figures 3, 6:
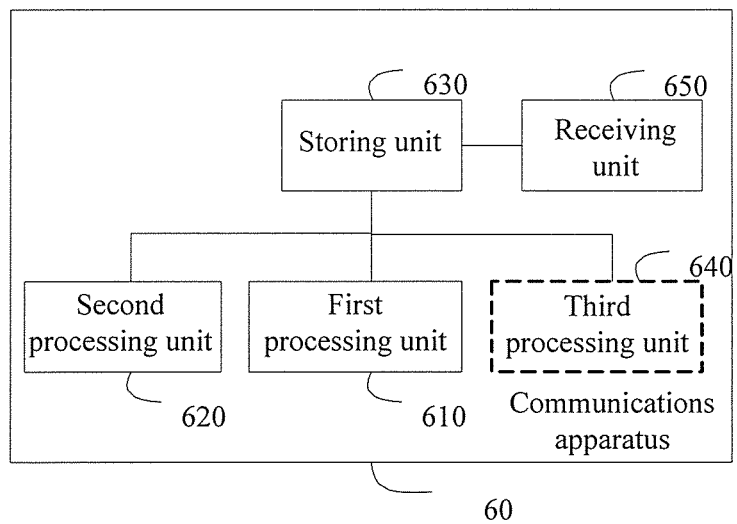
Figures 4, 6:
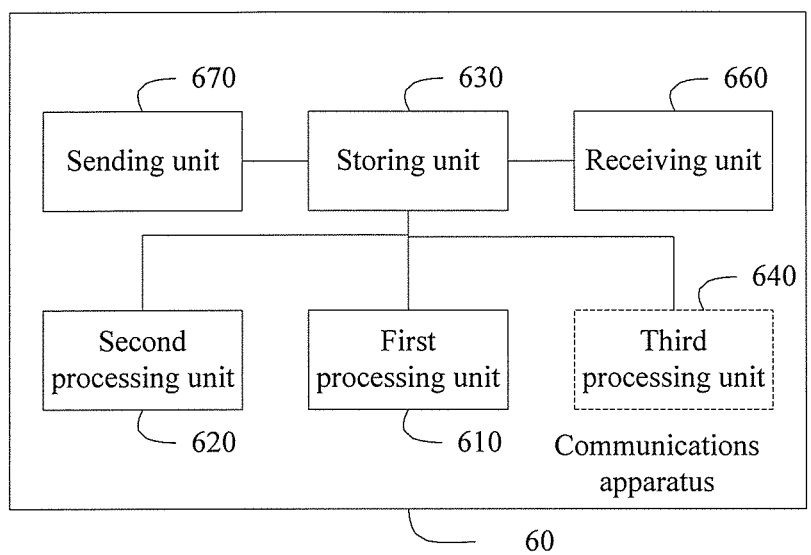

FIG. 6-1 is a schematic structural diagram of a communications apparatus 60 according to an embodiment of the present invention. As shown in FIG. 6-1, the communications apparatus 60 may include:

a first processing unit 610, configured to compare waiting time for scheduling of a first service with a first admission threshold, where the first service is a service for which a bearer has been established;

a second processing unit 620, configured to, if the waiting time for scheduling of the first service is greater than the first admission threshold, compare a satisfaction rate of the first service with a second admission threshold; and if the satisfaction rate of the first service is smaller than the second admission threshold, deny establishment of a bearer for a second service; or if the satisfaction rate of the first service is greater than or equal to the second admission threshold, allow establishment of a bearer for a second service, where the second service is a service for which bearer establishment is requested; and a storing unit 630, configured to store data that is required for the first processing unit 610 and the second processing unit 620 to perform the foregoing operations. For example, the storing unit 630 may be configured to store one or more of the following data: the waiting time for scheduling of the first service, the first admission threshold, the satisfaction rate of the first service, and the second admission threshold.

Optionally, on a basis of the communications apparatus 60 according to the embodiment shown in FIG. 6-1, the first processing unit 610 may further be configured to: if the waiting time for scheduling of the first service is smaller than or equal to the first admission threshold, allow the establishment of the bearer for the second service.

Optionally, on the basis of the communications apparatus 60 according to the embodiment shown in FIG. 6-1, as shown in FIG. 6-2, the communications apparatus 60 may further include:

a third processing unit 640, configured to: if the waiting time for scheduling of the first service is smaller than or equal to the first admission threshold, compare system resource usage with a third admission threshold; and if the system resource usage is smaller than or equal to the third admission threshold, allow the establishment of the bearer for the second service; and the storing unit 630 may further be configured to store the system resource usage and the third admission threshold.

Optionally, the third processing unit 610 may further be configured to: if the system resource usage is greater than the third admission threshold, compare the satisfaction rate of the first service with the second admission threshold; and if the satisfaction rate of the first service is smaller than the second admission threshold, deny the establishment of the bearer for the second service; or if the satisfaction rate of the first service is greater than or equal to the second admission threshold, allow the establishment of the bearer for the second service.

Optionally, on the basis of the communications apparatus 60 according to the embodiment shown in FIG. 6-1, as shown in FIG. 6-3, the communications apparatus 60 may further include:

a receiving unit 650, configured to receive a resource restriction indicator generated by another module. When the resource restriction indicator, such as a license restriction indicator, is received, a new service or a handover service cannot be admitted, even if a satisfaction rate of a service is 100%. On a basis of the communications apparatus 60 according to the embodiment shown in FIG. 6-2, the communications apparatus 60 may further include the third processing unit 640.

Optionally, on the basis of the communications apparatus 60 according to the embodiment shown in FIG. 6-1, as shown in FIG. 6-4, the communications apparatus 60 may further include:

a receiving unit 660, configured to receive a bearer establishment request, where the bearer establishment request is used to request the establishment of the bearer for the second service; and a sending unit 670, configured to: if the establishment of the bearer for the second service is allowed, send a bearer establishment allowing response; or, the sender 670 is further configured to: if the establishment of the bearer for the second service is denied, send a bearer establishment denial response. On a basis of the communications apparatus 60 according to the embodiment shown in FIG. 6-2, the communications apparatus 60 may further include the third processing unit 640. On a basis of the communications apparatus 60 according to the embodiment shown in FIG. 6-3, the receiving unit 660 and the receiving unit 650 may be a same receiving unit.

Optionally, the communications apparatus 60 may be the base station 120 or the network controller 130 on the wireless communications network 100 shown in FIG. 1. For example, the communications apparatus 60 may be an RNC in a UMTS system, or an eNode B in an LTE system.

According to the communications apparatus 60 provided in this embodiment of the present invention, the method for admission control provided in any one of the embodiments shown in FIG. 2-1 to FIG. 2-4, FIG. 3, and FIG. 4 may be implemented. For content not described herein in detail, reference may be made to the description of the foregoing method embodiments. When the communications apparatus 60 is used, system capacity of a wireless communications network can be effectively improved without requiring complex and inaccurate calculation of resource usage.

A person skilled in the art may understand that various illustrative logical blocks (illustrative logic block) and steps (step) that are listed in the embodiments of the present invention may be implemented by using electronic hardware, computer software, or a combination of the two. For the purpose of clearly displaying interchangeability (interchangeability) of hardware and software, functions of the foregoing various illustrative components (illustrative components) and steps have been generally described. Whether such functions are implemented by using the hardware or the software depends on a particular application and a design requirement of the entire system. A person skilled in the art may implement the functions for each particular application by using various methods, but such implementation should be construed as falling within the protection scope of the embodiments of the present invention.

The illustrative logical blocks, modules, and circuits described in the embodiments of the present invention may implement or operate the described functions by using a design of a general processor, a digital signal processor, an application-specific integrated circuit (ASIC), a field programmable gate array (FPGA) or another programmable logical apparatus, a discrete gate or transistor logic, a discrete hardware component, or a combination of any of the foregoing. The general processor may be a microprocessor. Optionally, the general processor may also be any traditional processor, controller, microcontroller, or state machine. The processor may also be implemented by using a combination of computing apparatuses, such as the digital signal processor and a microprocessor, multiple microprocessors, one or more microprocessors with a digital signal processor core, or any other similar configuration.

The steps of the methods or algorithms described in the embodiments of the present invention may be directly embedded into the hardware, a software module executed by the processor, or a combination of the two. The software module may be stored in a RAM memory, a flash memory, a ROM memory, an EPROM memory, an EEPROM memory, a register, a hard disk, a removable magnetic disk, a CD-ROM, or a storage medium of any other form in the art. Exemplarily, the storage medium may connect to the processor, so that the processor may read information from the storage medium and write information to the storage medium. Optionally, the storage medium may also be integrated into the processor. The processor and the storage medium may be disposed in the ASIC, and the ASIC may be disposed in a user terminal. Optionally, the processor and the storage medium may also be arranged in different components of the user terminal.

In one or more exemplary designs, the functions described in the embodiments of the present invention may be implemented by the hardware, the software, firmware, or any combination of the three. If being implemented by the software, these functions may be stored on a computer-readable medium or are transmitted to the computer-readable medium in a form of one or more instructions or code. The computer-readable medium includes a computer storage medium and a communications medium that enables a computer program to move from one place to another place. The storage medium may be an available medium that may be accessed by any general or special computer. For example, such computer-readable medium may include but is not limited to a RAM, a ROM, an EEPROM, a CD-ROM or another optical disc storage, a disk storage or another magnetic storage apparatus, or any other medium that may be used to bear or store program code, where the program code is in a form of an instruction or a data structure or in a form that can be read by the general or special computer or the general or special processor. In addition, any connection may be appropriately defined as the computer-readable medium. For example, if the software is transmitted from a website, a server, or another remote resource by using a coaxial cable, an optical fiber computer, a twisted-pair cable, a digital subscriber line (DSL) or in a wireless manner, such as infrared, radio, or microwave, it is also included in the defined computer-readable medium. The disc (disk) and the disk (disc) include a compressed disk, a laser disk, an optical disc, a DVD, a floppy disk, and a blue-ray disk. The disk generally copies data magnetically, and the disc generally copies data optically by means of laser. The foregoing combination may also be included in the computer-readable medium.

According to the foregoing description of this specification in the present invention, any content, in the technologies in the art, that may use or implement the present invention and any modification based on the disclosed content shall be considered to be obvious in the art. The basic principle described in the present invention may apply to other variations but does not go beyond the invention essence and scope of the present invention. Therefore, the content disclosed in the present invention is not limited to the described embodiments and designs but may also be extended to a maximum scope that is consistent with the principles and disclosed new features of the present invention.

What is claimed is:

1. A communications apparatus, comprising:
a processor; and
a memory coupled to the processor, the memory comprising instructions that, when executed by the processor, cause the apparatus to:
collect waiting time for scheduling of a first service in a predefined comparison period, wherein the waiting time for scheduling of the first service is a time interval from a time when the first service applies for a resource to be scheduled to a time when the first service obtains the scheduled resource;
obtain a single waiting time for scheduling of the first service by determining an average value of the waiting time for scheduling of multiple first services when there are multiple first services;
compare the single waiting time for scheduling of the first service with a first admission threshold, wherein the first service is a service for which a bearer has been established,
when the single waiting time for scheduling of the first service is greater than the first admission threshold, compare a satisfaction rate of the first service with a second admission threshold, and
when the satisfaction rate of the first service is greater than or equal to the second admission threshold, allow establishment of a bearer for a second service, wherein the second service is a service for which bearer establishment is requested and the second service is a different service from the first service.

2. The communications apparatus according to claim 1, wherein the memory further comprises instructions that, when executed by the processor, cause the apparatus to:

when the single waiting time for scheduling of the first service is smaller than or equal to the first admission threshold, allow establishment of a bearer for the second service.

3. The communications apparatus according to claim 1, wherein the memory further comprises instructions that, when executed by the processor, cause the apparatus to:
when the single waiting time for scheduling of the first service is smaller than or equal to the first admission threshold, compare system resource usage with a third admission threshold; and
when the system resource usage is smaller than or equal to the third admission threshold, allow the establishment of the bearer for the second service.

4. The communications apparatus according to claim 3, wherein the memory further comprises instructions that, when executed by the processor, cause the apparatus to:
when the system resource usage is greater than the third admission threshold, compare the satisfaction rate of the first service with the second admission threshold; and
when the satisfaction rate of the first service is greater than or equal to the second admission threshold, allow establishment of a bearer for the second service.

5. The communications apparatus according to claim 1, further comprising:
a receiver, configured to receive a bearer establishment request for the second service; and
a transmitter, configured to:
when the processor allows establishment of a bearer for the second service, send a bearer establishment allowing response.

6. The communications apparatus according to claim 1, wherein the communications apparatus is a base station or a network controller on a wireless communications network.

7. A method for admission control of a wireless communications network, the method comprising:
collecting waiting time for scheduling of a first service in a predefined comparison period, wherein the waiting time for scheduling of the first service is a time interval from a time when the first service applies for a resource to be scheduled to a time when the first service obtains the scheduled resource;
obtaining a single waiting time for scheduling of the first service by determining an average value of the waiting time for scheduling of multiple first services when there are multiple first services;
comparing, by a communications apparatus, the single waiting time for scheduling of the first service with a first admission threshold, wherein the first service is a service for which a bearer has been established;
when the single waiting time for scheduling of the first service is greater than the first admission threshold, comparing, by the communications apparatus, a satisfaction rate of the first service with a second admission threshold; and when the satisfaction rate of the first service is greater than or equal to the second admission threshold, allowing, by the communications apparatus, establishment of a bearer for a second service, wherein the second service is a service for which bearer establishment is requested and the second service is a different service from the first service.

8. The method according to claim 7, further comprising:
when the single waiting time for scheduling of the first service is smaller than or equal to the first admission threshold, allowing, by the communications apparatus, establishment of a bearer for the second service.

9. The method according to claim 7, further comprising:
when the single waiting time for scheduling of the first service is smaller than or equal to the first admission threshold, comparing, by the communications apparatus, system resource usage with a third admission threshold; and
when the system resource usage is smaller than or equal to the third admission threshold, allowing, by the communications apparatus, establishment of a bearer for the second service.

10. The method according to claim 9, further comprising:
when the system resource usage is greater than the third admission threshold, comparing, by the communications apparatus, the satisfaction rate of the first service with the second admission threshold; and
when the satisfaction rate of the first service is greater than or equal to the second admission threshold, allowing, by the communications apparatus, establishment of a bearer for the second service.

11. The method according to claim 7, wherein the first service is differentiated according to quality of service (QoS) requirements to obtain a service class, and the first admission threshold is adjusted according to the service class of the first class.

12. The method according to claim 7, wherein the first service is a voice over internet protocol (VoIP) service, and the first admission threshold is 100 milliseconds.

13. The method according to claim 7, wherein:
for two cases in which a second service is a new service and another second service is a handover service, an admission threshold for the handover service is lower than an admission threshold of the new service.

14. The method according to claim 7, wherein:
for a second service for a high-priority user and another second service for a low-priority user, an admission threshold for the second service for a high-priority user is lower than an admission threshold for the second service for a low-priority user.

15. The method according to claim 7, further comprising:
receiving, by the communications apparatus, a bearer establishment request for the second service; and
when allowing establishment of a bearer for the second service, sending, by the communications apparatus, a bearer establishment allowing response.

* * * * *